(12) United States Patent
Feng

(10) Patent No.: US 7,047,347 B2
(45) Date of Patent: May 16, 2006

(54) DATA TRANSFER METHOD FOR UNIVERSAL SERIAL BUS DEVICE

(75) Inventor: Yu-Ping Feng, Taipei (TW)

(73) Assignee: Faraday Technology Corp., Hsin-Chu (TW)

( * ) Notice: Subject to any disclaimer, the term of this patent is extended or adjusted under 35 U.S.C. 154(b) by 173 days.

(21) Appl. No.: 10/708,174

(22) Filed: Feb. 13, 2004

(65) Prior Publication Data

US 2005/0125589 A1    Jun. 9, 2005

(51) Int. Cl.
*G06F 13/20* (2006.01)
*G06F 13/38* (2006.01)

(52) U.S. Cl. ................ 710/313; 710/35; 713/502

(58) Field of Classification Search ........... 710/313, 710/306, 314, 100, 33, 34, 29, 106, 48, 60, 710/260, 35; 709/227–234; 370/229, 230, 370/465; 358/426.03, 448; 713/502
See application file for complete search history.

(56) References Cited

U.S. PATENT DOCUMENTS

| | | | | |
|---|---|---|---|---|
| 5,832,492 A | * | 11/1998 | Wooten | 707/101 |
| 6,288,800 B1 | * | 9/2001 | Izumi | 358/468 |
| 6,307,974 B1 | * | 10/2001 | Tsujimoto | 382/239 |
| 6,434,643 B1 | * | 8/2002 | Ejiri | 710/58 |
| 6,658,512 B1 | * | 12/2003 | Gokulrangan | 710/117 |
| 6,793,144 B1 | * | 9/2004 | Guez et al. | 235/492 |
| 6,934,790 B1 | * | 8/2005 | Saida | 710/313 |
| 2002/0116566 A1 | * | 8/2002 | Saida | 710/313 |

OTHER PUBLICATIONS

"Performance analysis of burst level bandwidth allocation using multipath routing reservation" by Ashibani et al. (abstract only) Publication Date: Jul. 4-7, 2001.*

* cited by examiner

*Primary Examiner*—Gopal C. Ray
(74) *Attorney, Agent, or Firm*—Winston Hsu

(57) ABSTRACT

A data transfer method for a Universal Serial Bus (USB) device is provided. The data transfer rate of a bulk transfer transmission in the USB is detected first for selecting a transfer transmission having a better data transfer rate between the bulk transfer transmission in the USB and an interrupt transfer transmission in the USB, so as to ensure the data transfer bandwidth in the USB is better utilized by the USB device.

6 Claims, 3 Drawing Sheets

DATA TRANSFER METHOD FOR UNIVERSAL SERIAL BUS DEVICE

BACKGROUND OF INVENTION

1. Field of the Invention

The present invention relates to a Universal Serial Bus (USB) device, and more particularly, to a data transfer method for a USB device.

2. Description of the Related Art

A Universal Serial Bus (USB) is an interface used for connecting the peripheral device with a computer device such as a desktop computer, a notebook computer, and a Personal Digital Assistant (PDA). Since it is hot-swappable, a user can easily plug the peripheral device into or remove it from the computer device. The computer device can automatically detect the peripheral device for maintaining its normal operation when the peripheral device is plugged into or removed from the computer device. Therefore, USB has interfaces have been widely applied in peripheral devices such as keyboards, mice, network adapters, and printers. Moreover, since it is convenient to add or remove a peripheral device with a USB interface, a storage device using die USB interface has been developed to facilitate the data transfer and data sharing between different computers.

There are four kinds of transfer transmission defined in the USB protocol (bulk, control, interrupt and isochronous). The most frequently used transfer transmission is bulk transfer. The bulk transfer transmission is commonly used in the USB storage device for transmitting a great amount of data. The bulk transfer transmission has a USB hand shake mechanism, thus it can guarantee the correctness of the data transfer. However, among various USB transmissions, since the bulk transfer transmission cannot guarantee the data transfer bandwidth, when several USB devices are using a USB simultaneously, the bandwidth of the device using the bulk transfer transmission is divided and shared by all USB devices in the USB and the transfer rate is degraded.

FIG. 1 is a transfer rate sharing diagram of a USB connecting to different quantities of USB devices using bulk transfer transmission. It is assumed that the maximum data transfer rate for the USB is 48 Mbytes/sec, and there are three devices, A, B, and C, each having only one bulk endpoint. In FIG. 1(a), only device A is connected to the USB, and the data transfer rate of device A is up to 48 Mbytes/sec. In FIG. 1(b), both devices A and B are connected to a same USB and use the USB simultaneously, and the shared data transfer rate of each device A and B is 24 Mbytes/sec, respectively. In FIG. 1(c), all device A, B, and C are connected to the USB and use the USB simultaneously, and the shared data transfer rate of each device A, B, and C is 16 Mbytes/sec, respectively. In other words, when the number of the USB devices connected to the USB increases, the data transfer rate of each USB device is decreased due to the shared bandwidth, thus it cannot meet the desired expectation.

SUMMARY OF INVENTION

In the light of the preface, it is an object of the present invention to provide a data transfer method for a USB device. The method detects a data transfer rate of a bulk transfer transmission in the USB first, and when the data transfer rate of the bulk transfer transmission in the USB is lower than a predetermined value, the method selects an interrupt transfer transmission in the USB to transfer the data in the USB device, so as to ensure that the transfer bandwidth thereof is bettor utilized.

In order to achieve the object mentioned above and other advantages, the present invention provides a data transfer method for a USB device. The method comprises: connecting a USB device to a USB; determining whether the data transfer rate of the bulk transfer transmission in the USB is lower than a predetermined value; and if the data transfer rate of the bulk transfer transmission in the USB is lower than the predetermined value, swapping to use the interrupt transfer transmission in the USB to transfer the data in the USB device, so as to ensure the transfer bandwidth thereof is better utilized.

In an embodiment of the present invention, the data transfer method for the USB device further comprises: when the data transfer rate of the bulk transfer transmission in the USB is not lower than the predetermined value, the bulk transfer transmission in the USB to transfer the data in the USB device is swapped to use.

In an embodiment of the present invention, the data transfer method for the USB device further comprises: when using the interrupt transfer transmission in the USB to transfer the data in the USB device for a predetermined period of time, swapping back to use the bulk transfer transmission to transfer the data in the USB device for trying to use a higher transfer rate to transfer the data in the USB device.

In an embodiment of the present invention, the predetermined value set in the data transfer method for the USB device is preferably a data transfer rate which is guaranteed by the interrupt transfer transmission in the USB.

In summary, by applying a data transfer method for the USB device provided by the present invention, a data transfer rate of the bulk transfer transmission in the USB is detected first, and when the data transfer rate of the bulk transfer transmission in the USB is lower than a predetermined value, an interrupt transfer transmission in the USB is selected to transfer the data in the USB device, so as to ensure the transfer bandwidth thereof is better utilized.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

As mentioned above, the bulk transfer transmission is commonly used in the USB storage device such as the flash disk for transmitting a great amount of data. However, since the bulk transfer transmission using the USB cannot guarantee the data transfer bandwidth when multiple USB device use one USB bus simultaneously, the bandwidth of the USB is distributed and shared by all USB device inserted into the same USB bus and accordingly, the transfer rate is degraded. Therefore, in order to resolve the above problem, a data transfer method for the USB device is provided by the present invention. The method is suitable for a USB device which predefines two sets of descriptor, wherein one set defines the USB device as a bulk endpoint, and the other set defines the USB device as an interrupt endpoint, so as to ensure the transfer bandwidth thereof is better utilized while still maintaining the general characteristic of the USB device.

Figure 1:
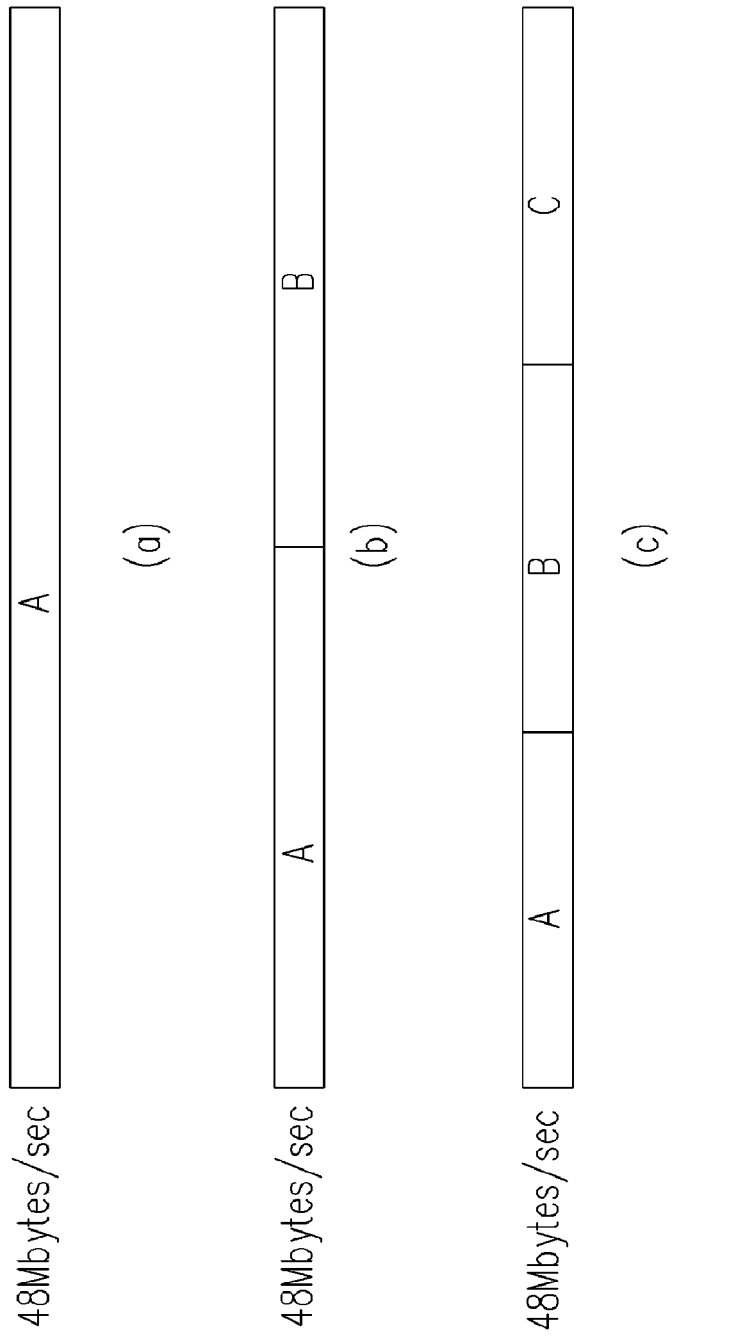
FIG. 1 is a transfer rate sharing diagram of a USB connecting to different quantities of USB devices using the bulk transfer transmission.
Figure 2:
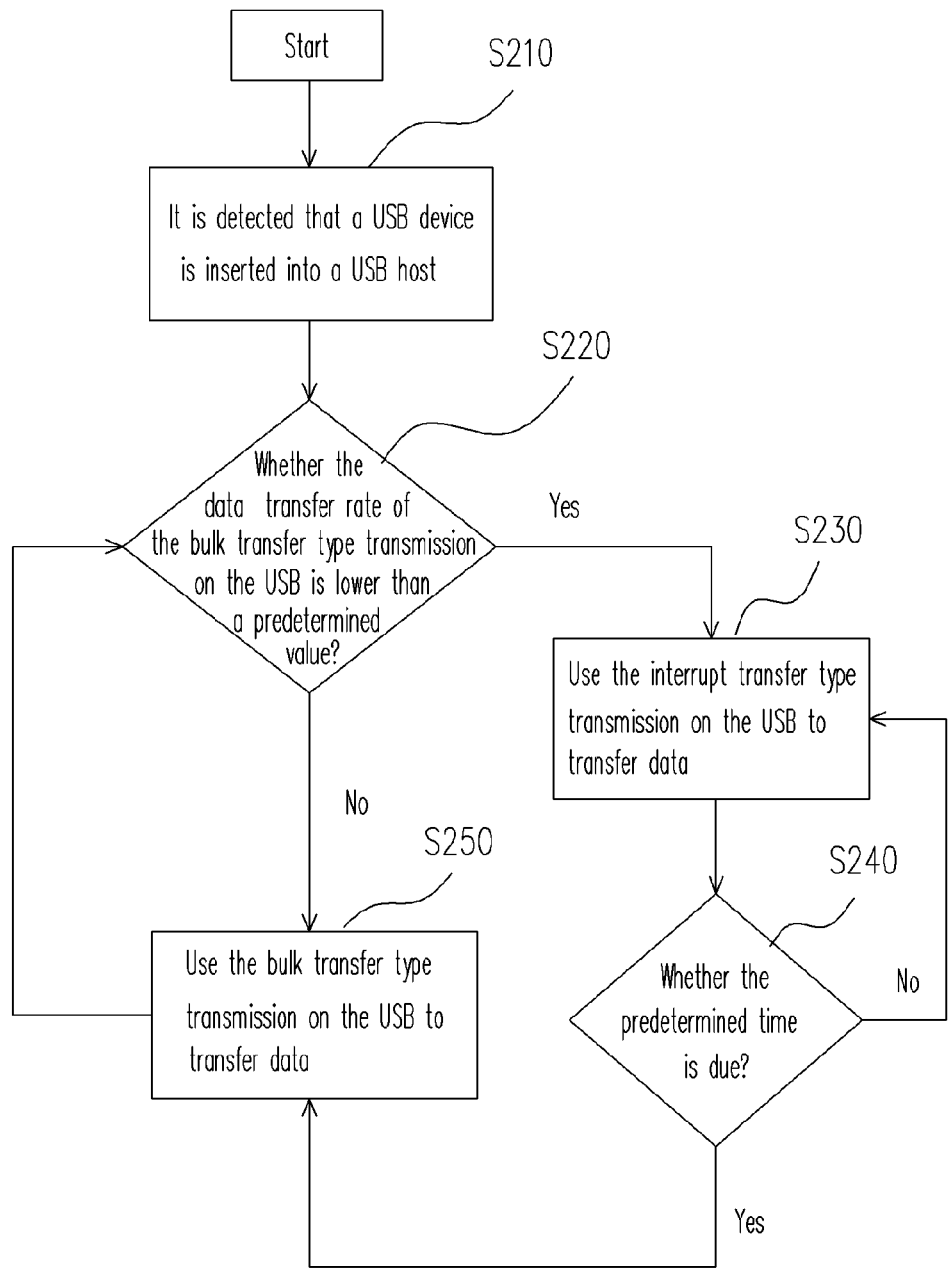
FIG. 2 is a flow chart illustrating a data transfer method for the USB device according to a preferred embodiment of the present invention.

FIG. 2 is a flow chart illustrating a data transfer method for the USB device according to a preferred embodiment of the present invention. As shown in the diagram, in step S210, whether or not a USB device is inserted into a USB host is detected, that is whether the USB device is connected to the USB is detected, if yes, the process enters into step S220 for detecting and determining whether or nor the data transfer rate of the bulk transfer transmission in the USB is lower than a predetermined value.

When it is determined in step S220 that the data transfer rate of the bulk transfer transmission in the USB is lower than the predetermined value, the process enters into step S230 for swapping to use the interrupt transfer transmission in the USB to transfer the data in the USB device. Because having the USB hand shake mechanism, the interrupt transfer transmission of the USB guarantees the correctness of the data transfer, and it is also a transfer that guarantees the transfer bandwidth among various USB transmissions. Therefore, no matter how many USB devices are connected to the USB simultaneously, it is guaranteed that a certain data transfer bandwidth is reserved. Therefore, it is ensured that the transfer bandwidth thereof is better utilized even when the data transfer rate of the bulk transfer transmission in the USB is degraded.

Figure 3:
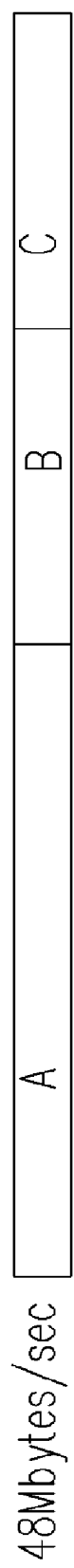
FIG. 3 is a transfer rate sharing diagram of a USB which connects to different number of the USB devices using the bulk transfer transmission and the interrupt transfer transmission.
Figure 3:

Referring to FIG. 3, a transfer rate sharing diagram of a USB connecting to different number of the USB devices using the bulk transfer transmission and the interrupt transfer transmission is shown. It is assumed that the maximum data transfer rate for the USB is 48 Mbytes/sec, the data transfer bandwidth reserved for the interrupt transfer transmission in the USB is 24 Mbytes/sec, and there are four devices A, B, C, and D, wherein each of the devices B, C, and D has a bulk endpoint. As shown in FIG. 3(a), when devices A, B, and C are use one USB simultaneously, the shared data transfer rate for device A used in the data transfer method for the USB device according to the present invention is 24 Mbytes/sec, and the shared data transfer rate for each device B and C is 12 Mbytes/sec, respectively. As shown in FIG. 3(b), when devices A, B, C, and D are using the USB simultaneously, the shared data transfer rate for device A used in the data transfer method for the USB device according to the present invention is still 24 Mbytes/sec, whereas the shared data transfer rate for each device B, C, and D is 8 Mbytes/sec, respectively. In other words, it is ensured that the data transfer rate of device A used in the data transfer method for the USB device according to the present invention is 24 Mbytes/sec.

Referring to FIG. 2, after swapping to use the interrupt transfer transmission in the USB to transfer tile data in the USB device in step S230, the process enters into step S240 for determining whether or not the predetermined time is due. If the predetermined time is due, the process enters into step S250 for swapping to use the bulk transfer transmission in the USB to transfer the data in the USB device attempting to use a higher data transfer rate to transfer data. The reason for having this step is because the number of the USB devices connected to the USB is dynamically changed. Therefore, when the number of the USB devices connected to the USB is decreased or the required data transfer bandwidth is reduced, the data transfer rate of the bulk transfer transmission in the USB is higher than the predetermined value again. Meanwhile, the bulk transfer transmission in the USB is used to transfer data, such that the USB bandwidth is fully utilized.

In addition, if it is determined in step S220 that the data transfer rate of the bulk transfer transmission in the USB is not lower than the predetermined value, the process enters into step S250 where the bulk transfer transmission in the USB is used to transfer the data in the USB device.

The predetermined value set in the data transfer method for the USB device is preferably a data transfer rate which is guaranteed by the interrupt transfer transmission in the USB, for example, 24 Mbytes/sec as mentioned above. Therefore, when using the data transfer method for the USB device provided by the present invention to transfer the data in the USB device, it is possible to select a transmission method with a higher data transfer rate between the data transfer rate of the bulk transfer transmission in the USB and the data transfer rate of the interrupt transfer transmission in the USB, so as to ensure the transfer bandwidth thereof is better utilized.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A data transfer method for a USB device, comprising:
   connecting a USB device to a USB;
   determining whether a data transfer rate of a bulk transfer transmission in the USB is lower than a predetermined value; and
   using the bulk transfer transmission in the USB to transfer the data in the USB device if the data transfer rate of the bulk transfer transmission in the USB is not lower than the predetermined value, and/or swapping to use an interrupt transfer transmission in the USB to transfer the data in the USB device if the data transfer rate of the bulk transfer transmission in the USB is lower than the predetermined value.

2. The data transfer method for the USB device of claim 1, further comprising:
   after using the interrupt transfer transmission in the USB to transfer the data in the USB device for a predetermined period of time, swapping to use the bulk transfer transmission in the USB to transfer the data in the USB device.

3. The data transfer method for the USB device of claim 1, wherein the predetermined value is a data transfer rate which is guaranteed by the interrupt transfer transmission in the USB.

4. A data transfer method for a USB device, comprising:
   determining whether a data transfer rate of a bulk transfer transmission in a USB connected to a USB device is lower than a predetermined value; and
   using the bulk transfer transmission in the USB to transfer the data in the USB device when the data transfer rate of the bulk transfer transmission in the USB is not lower than the predetermined value, and/or using an interrupt transfer transmission in the USB to transfer data in the USB device if the data transfer rate of the bulk transfer transmission in the USB is lower than the predetermined value.

5. The data transfer method for the USB device of claim 4, further comprising:
   after using the interrupt transfer transmission in the USB to transfer the data in the USB device for a predetermined period of time, swapping to the bulk transfer transmission in the USB to transfer the data in the USB device.

6. The data transfer method for the USB device of claim 4, wherein the predetermined value is a data transfer rate which is guaranteed by the interrupt transfer transmission in the USB.

* * * * *